Dec. 10, 1940. A. R. GRAD 2,224,502
LUBRICATING APPARATUS
Filed Nov. 26, 1937 2 Sheets-Sheet 1

INVENTOR
ADOLF R. GRAD
BY *Wesley* *Merrill*
ATTORNEY.

Dec. 10, 1940.   A. R. GRAD   2,224,502
LUBRICATING APPARATUS
Filed Nov. 26, 1937   2 Sheets-Sheet 2

INVENTOR
ADOLF R. GRAD
BY
ATTORNEY.

Patented Dec. 10, 1940

2,224,502

UNITED STATES PATENT OFFICE 2,224,502

LUBRICATING APPARATUS

Adolf R. Grad, Wauwatosa, Wis., assignor to The Oilgear Company, Milwaukee, Wis., a corporation of Wisconsin Application November 26, 1937, Serial No. 176,408

4 Claims. (Cl. 184—29)

This invention relates to lubricating apparatus of a type suitable for delivering lubricant to moving parts of a machine which is operated in whole or in part by fluid under pressure. Such apparatus ordinarily includes a lubricant pump which is operated intermittently so that small quantities of lubricant are delivered successively to the machine parts.

It is common practice to transmit motion from a moving part of a machine to a lubricant pump to effect operation thereof, but such practice ordinarily necessitates the use of complicated and expensive actuating mechanism.

The present invention has as an object to provide a fluid operated machine with a lubricating apparatus which is actuated by the motive fluid that operates the machine.

Another object is to provide a lubricating apparatus which may be economically manufactured and operated.

Another object is to provide a lubricating apparatus with a fluid operated actuator which is sturdy in construction and positive in operation. Other objects and advantages will appear from the description hereinafter given of a lubricating apparatus in which the invention is embodied.

According to the invention in its general aspect and as ordinarily embodied in practice, a fluid operated machine is provided with a lubricating apparatus having a pump for supplying lubricant to the moving parts of the machine, and the pump is operated in response to reversal of the flow of fluid in the circuit of the machine.

The invention is exemplified by the lubricating apparatus shown in the accompanying drawings in which the views are as follows.

Figure 1:
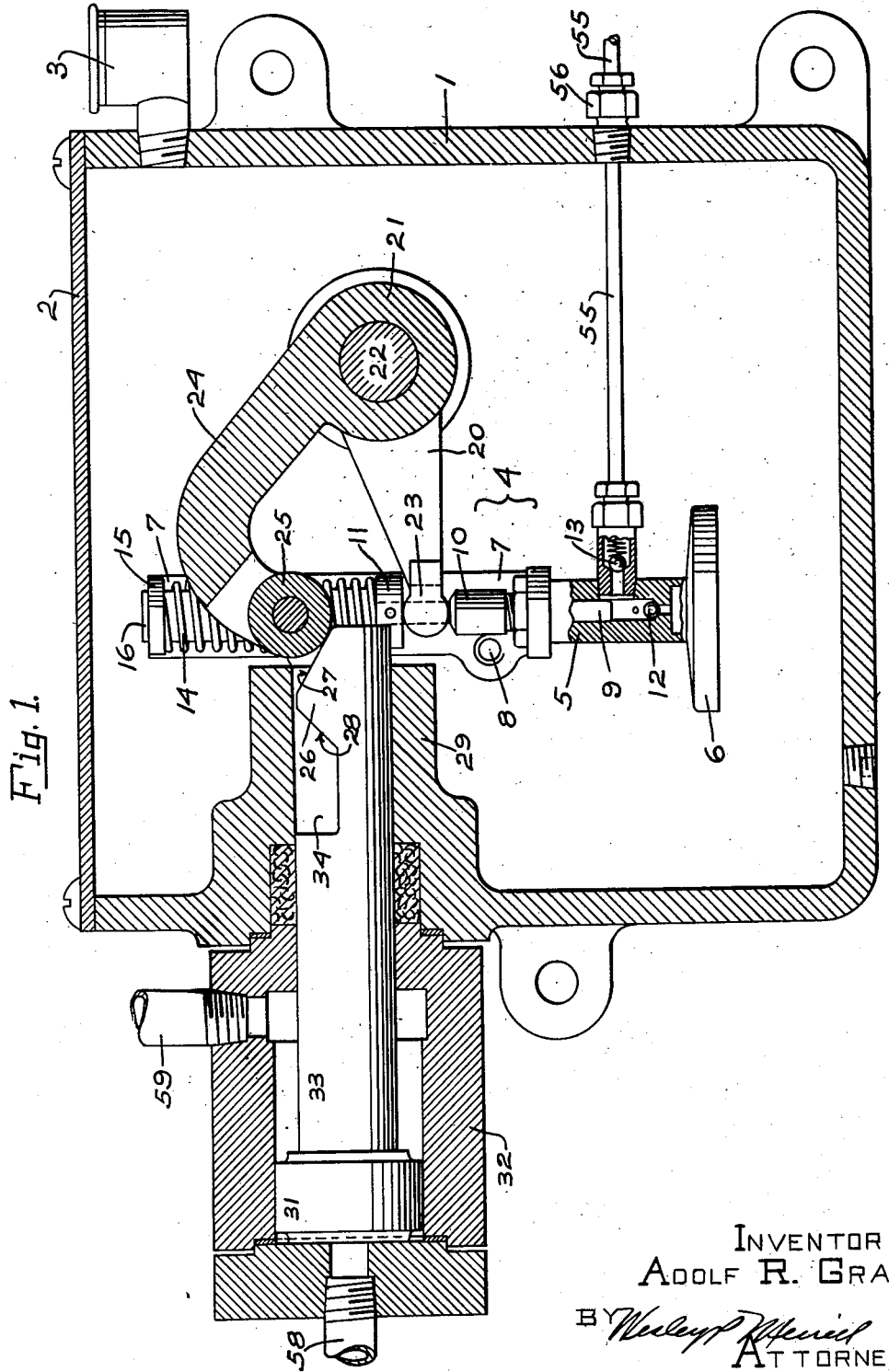
Fig. 1 is a central vertical section through the lubricating apparatus.
Figure 2:
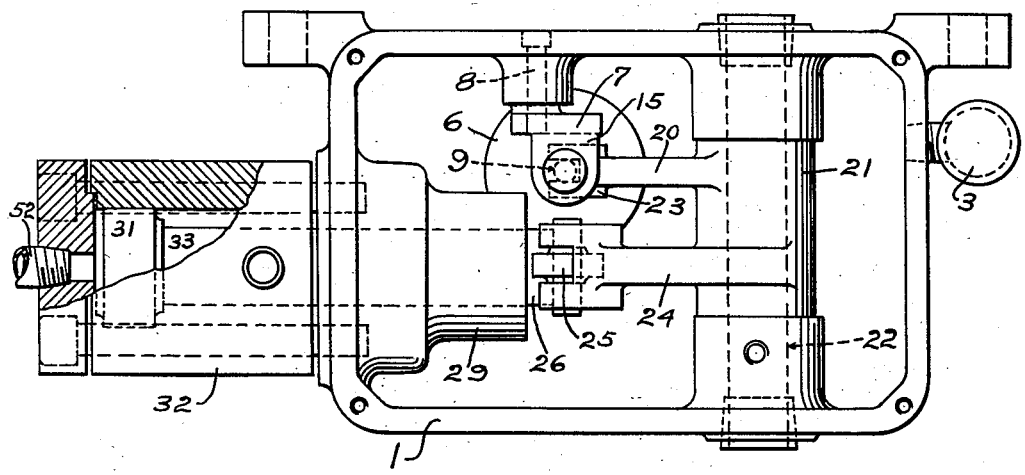
Fig. 2 is a top plan view thereof with the cover of reservoir removed.

The apparatus is provided with a stationary reservoir 1 which ordinarily contains a supply of liquid lubricant and is closed at its top by a cover plate 2, the lubricant being introduced into the reservoir through a filler fitting 3 connected to the side wall thereof.

Reservoir 1 contains a pump 4 which draws lubricant therefrom and delivers it to the moving parts of the machine. Since the pump shown in the drawings is a standard commercial article manufactured by Bijur Lubricator Corporation, it has not been completely illustrated and only a brief description thereof is necessary.

As shown, pump 4 is provided with a cylinder 5 having its lower end closed by a filter 6 and its upper end fixed to the lower end of a bracket 7 which is fastened to one wall of reservoir 1 by bolts 8.

Cylinder 5 has fitted therein a plunger 9 which extends upward through a gland 10 and has its upper end connected to a collar 11. When raised, plunger 9 will draw lubricant into cylinder 5 through filter 6 and through a check valve 12 arranged in the lower end of cylinder 5. When plunger 9 descends, valve 12 will close and then plunger 9 will eject lubricant from cylinder 5 through a check valve 13 which extends from one side thereof.

Plunger 9 is urged downward by a helical compression spring 14 arranged between collar 11 and a flange 15 formed on the upper end of bracket 7. Spring 14 is retained in position by a cylindrical guide which is arranged therein and has its lower end connected to collar 11 and its upper end slidable through flange 15.

Plunger 9 is adapted to be raised by a lever 20 which has a hub 21 journaled upon a shaft 22 supported in opposite walls of reservoir 1. The free end of lever 20 is provided with a fork 23 the arms of which are arranged upon opposite sides of plunger 9 between collar 11 and gland 10 so that, when lever 20 is rotated through a small angular distance in a clockwise direction, fork 23 will engage collar 11 and raise plunger 9.

Hub 21 is provided with an arm 24 which extends upward at an angle to lever 20 and has its upper end bifurcated and a roller 25 mounted therein. Roller 25 is arranged above fork 23 but offset laterally therefrom. The arrangement is such that, when roller 25 is raised, fork 23 will raise plunger 9.

Roller 25 is adapted to be raised by a cam 26 which is provided with two oppositely inclined cam faces 27 and 28 and is fitted for reciprocation in a guide 29 shown as being formed integral with a wide wall of reservoir 1.

Cam 26 is adapted to be reciprocated by a piston 31 fitted in a cylinder 32 which is attached to a side wall of reservoir 1 in axial alinement with guide 29. As shown, cam 26 is formed integral with the piston rod 33 of piston 31, and rod 33 is cut away at the left of cam face 28 to provide a recess 34 into which roller 25 may descend after piston 31 has moved cam 26 toward the right to the position shown in Fig. 3.

Figure 3:
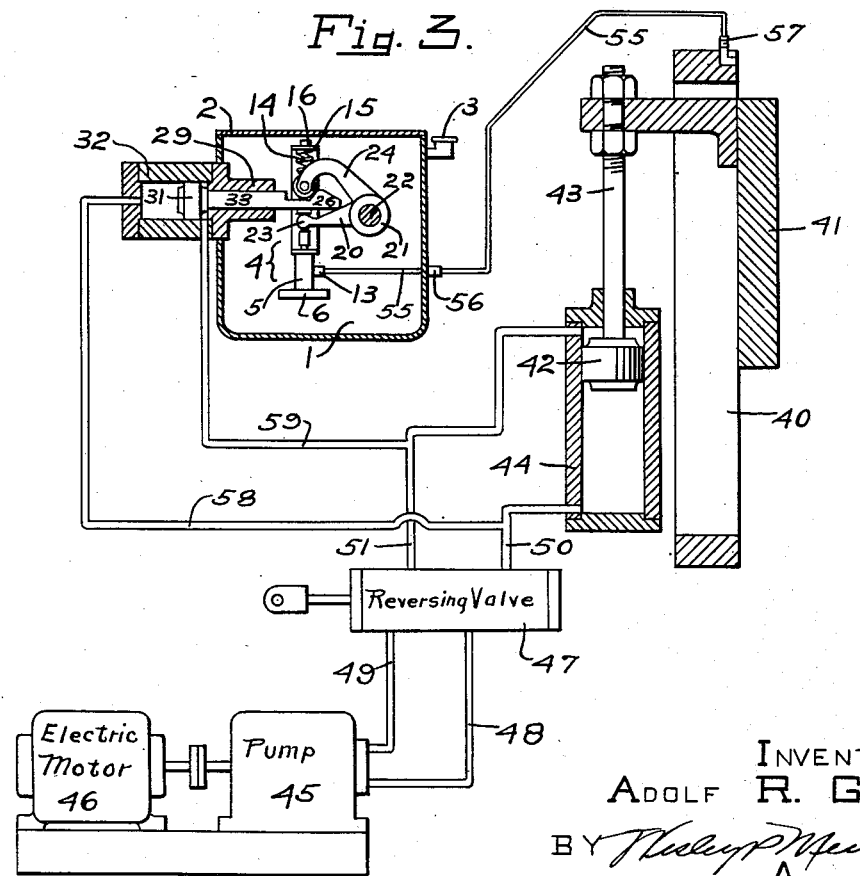
Fig. 3 is a diagram showing the invention applied to a machine tool.

The arrangement is such that, when fluid under pressure is supplied to the outer end of cylinder 32, piston 31 will advance cam 26 from the position shown in Fig. 1 to the position shown in Fig. 3. During the first part of the movement of cam 26, roller 25 will ride upward on cam face 27 and swing arm 24 through a small angular distance in a clockwise direction, thereby causing lever 20 to raise plunger 9 which will draw lubricant from reservoir 1 through filter 6 and check valve 12 into cylinder 5. After the apex of cam 26 has passed roller 25 so that roller 25 is free to move downward into recess 34, spring 14 will cause plunger 9 to move downward and eject lubricant from cylinder 5 through check valve 13.

When fluid under pressure is supplied to the inner end of cylinder 32, piston 31 will retract cam 26 from the position shown in Fig. 3 to the position shown in Fig. 1. During retraction of cam 26, roller 25 will first ride upward on cam face 28 and then descend to the position shown in Fig. 1, thereby causing pump 4 to be operated as explained above.

For the purpose of illustration, the lubricating apparatus has been shown in Fig. 3 as being employed to supply lubricant to the guideways 40 of a machine tool which, since it forms no part of the present invention, has not been illustrated in detail. It is deemed sufficient to state herein that the machine tool has a tool slide 41 mounted upon guideways 40 and adapted to be reciprocated thereon by a piston 42 which is connected to slide 41 by a piston rod 43 and fitted in a stationary cylinder 44.

Liquid for operating piston 42 is supplied to cylinder 44 by a pump 45 which is driven by an electric motor 46. The delivery of liquid to cylinder 44 is controlled by a reversing valve 47 which is connected to pump 45 by two channels 48 and 49 and to opposite ends of cylinder 44 by two channels 50 and 51.

The arrangement is such that, when reversing valve 47 is in one position, liquid from pump 45 will flow through channel 48, valve 47 and channel 50 to the lower end of cylinder 44 and cause piston 42 to move slide 41 upward and, when reversing valve 47 is in another position, liquid from pump 45 will flow through channel 49, valve 47 and channel 51 to the upper end of cylinder 44 and cause piston 40 to move slide 41 downward.

The lubricating apparatus applies lubricant to the moving parts of the machine through tubing 55 which is connected at one of its ends to the outlet of check valve 13 and extends through a gland 56 fixed in a side wall of reservoir 1. For the purpose of illustration, tubing 55 has been shown as having its other end connected to a lubricant fitting 57 attached to guideways 40 but it is to be understood that tubing 55 may be connected through branch tubing and other fittings to as many points on a machine as need to be lubricated.

In order that the lubricating apparatus may operate automatically, cylinder 32 has its outer end connected to channel 50 by a channel 58 and its inner end connected to channel 51 by a channel 59 so that, when pump 45 delivers liquid through channel 50 to the lower end of cylinder 44, liquid may flow through channel 58 to the outer end of cylinder 32 and move piston 31 from the position shown in Fig. 1 to the position shown in Fig. 3 and, when pump 45 delivers liquid through channel 51 to the upper end of cylinder 44, liquid may flow through channel 59 to the inner end of cylinder 32 and move piston 31 from the position shown in Fig. 3 to the position shown in Fig. 1. Consequently, piston 32 will be actuated and cause pump 4 to be operated in response to each reversal of flow of liquid in the hydraulic circuit of the machine.

The invention herein set forth is susceptible of various modifications and adaptations without departing from the scope thereof as hereafter claimed.

The invention is hereby claimed as follows:

1. In a machine tool having a hydraulic motor for driving it, a pump for supplying liquid to said motor to energize the same, fluid channels connecting said pump and said motor and forming therewith a hydraulic circuit, means for reversing the flow in said circuit, and a lubricant pump, the combination of means for actuating said lubricant pump, a stationary cylinder, a piston arranged in said cylinder for operating said actuating means, and fluid channels connecting opposite ends of said cylinder to opposite sides of said circuit to thereby cause said piston to be moved in one direction or the other and effect operation of said actuating means in response to each reversal of flow in said circuit.

2. In a machine tool having a hydraulic motor for driving it, a pump for supplying liquid to said motor to energize the same, fluid channels connecting said pump and said motor and forming therewith a hydraulic circuit, means for reversing the flow in said circuit, and a lubricant pump, the combination of means for actuating said lubricant pump, a stationary cylinder, a piston fitted in said cylinder and provided with a piston rod having a cam arranged thereon for operating said actuating means, and fluid channels connecting opposite ends of said cylinder to opposite sides of said circuit to thereby cause said piston to be moved in one direction or the other and effect operation of said actuating means in response to each reversal of flow in said circuit.

3. In a machine tool having a hydraulic motor for driving it, a pump for supplying liquid to said motor to energize the same, fluid channels connecting said pump and said motor and forming therewith a hydraulic circuit, means for reversing the flow in said circuit, and a lubricant pump having a plunger urged in one direction by a spring, the combination of actuating means for moving the plunger of said lubricant pump in the opposite direction, a stationary cylinder, a piston fitted in said cylinder and provided with a piston rod having a cam arranged thereon for operating said actuating means, and fluid channels connecting opposite ends of said cylinder to opposite sides of said circuit to thereby cause said piston to be moved in one direction or the other and effect operation of said actuating means in response to each reversal of flow in said circuit.

4. In a machine tool having a hydraulic motor for driving it, a pump for supplying liquid to said motor to energize the same, fluid channels connecting said pump and said motor and forming therewith a hydraulic circuit, means for reversing the flow in said circuit, and a lubricant pump having a plunger urged in one direction by a spring, the combination of actuating means for moving the plunger of said lubricant pump in the opposite direction, a stationary cylinder, a piston fitted in said cylinder and provided with a piston rod having oppositely inclined cam faces formed thereon for effecting operation of said actuating means in opposite directions during movement of said piston in each direction, and fluid channels connecting opposite ends of said cylinder to opposite sides of said circuit to thereby cause said piston to be moved in one direction or the other and effect operation of said actuating means in response to each reversal of flow in said circuit.

ADOLF R. GRAD.